United States Patent
Bluhm et al.

(10) Patent No.: US 7,185,486 B2
(45) Date of Patent: *Mar. 6, 2007

(54) METHOD FOR THE POST-TREATMENT OF EXHAUST GASES BY SUBSEQUENT INJECTION OF FUEL IN A DIESEL-TYPE INTERNAL COMBUSTION ENGINE PROVIDED WITH A PRE-CATALYST AND A PARTICULATE FILTER

(75) Inventors: Kurt Bluhm, Neckarsulm (DE); Henning Loerch, Weinsberg (DE)

(73) Assignee: Audi AG (DE)

(*) Notice: Subject to any disclaimer, the term of this patent is extended or adjusted under 35 U.S.C. 154(b) by 0 days.

This patent is subject to a terminal disclaimer.

(21) Appl. No.: 11/217,396

(22) Filed: Jan. 4, 2006

(65) Prior Publication Data

US 2006/0086082 A1   Apr. 27, 2006

Related U.S. Application Data

(62) Division of application No. 10/129,079, filed as application No. PCT/EP00/10241 on Oct. 18, 2000, now Pat. No. 6,971,230.

(30) Foreign Application Priority Data

Nov. 2, 1999   (DE) .................................. 19952830

(51) Int. Cl.
*F01N 3/00*   (2006.01)

(52) U.S. Cl. ............................. 60/286; 60/295; 60/297; 60/311

(58) Field of Classification Search .................. 60/276, 60/286, 295, 297, 311

See application file for complete search history.

(56) References Cited

U.S. PATENT DOCUMENTS

| | | | | | |
|---|---|---|---|---|---|
| 4,535,588 | A | * | 8/1985 | Sato et al. | 60/286 |
| 4,902,487 | A | * | 2/1990 | Cooper et al. | 423/215.5 |
| 5,067,320 | A | * | 11/1991 | Kanesaki | 60/297 |
| 5,207,990 | A | * | 5/1993 | Sekiya et al. | 422/183 |
| 5,711,149 | A | * | 1/1998 | Araki | 60/278 |
| 5,746,989 | A | * | 5/1998 | Murachi et al. | 423/213.7 |
| 5,974,791 | A | * | 11/1999 | Hirota et al. | 60/276 |
| 6,293,096 | B1 | * | 9/2001 | Khair et al. | 60/286 |

* cited by examiner

*Primary Examiner*—Thomas Denion
*Assistant Examiner*—Diem Tran
(74) *Attorney, Agent, or Firm*—Stevens, Davis, Miller & Mosher, LLP

(57) ABSTRACT

A process is proposed for exhaust gas aftertreatment by afterinjection of fuel in a diesel internal combustion engine with a precatalyst and a particulate filter, in which process the afterinjection NE is performed as a function of the temperature in the area of the precatalyst $T_{cat}$ and of the state of charging of the particulate filter. Since this process operates with especially high efficiency in heretofore critical short-distance operation of diesel internal combustion engines, the strict requirements of future legislation relating to exhaust gas emissions can immediately be met.

17 Claims, 1 Drawing Sheet

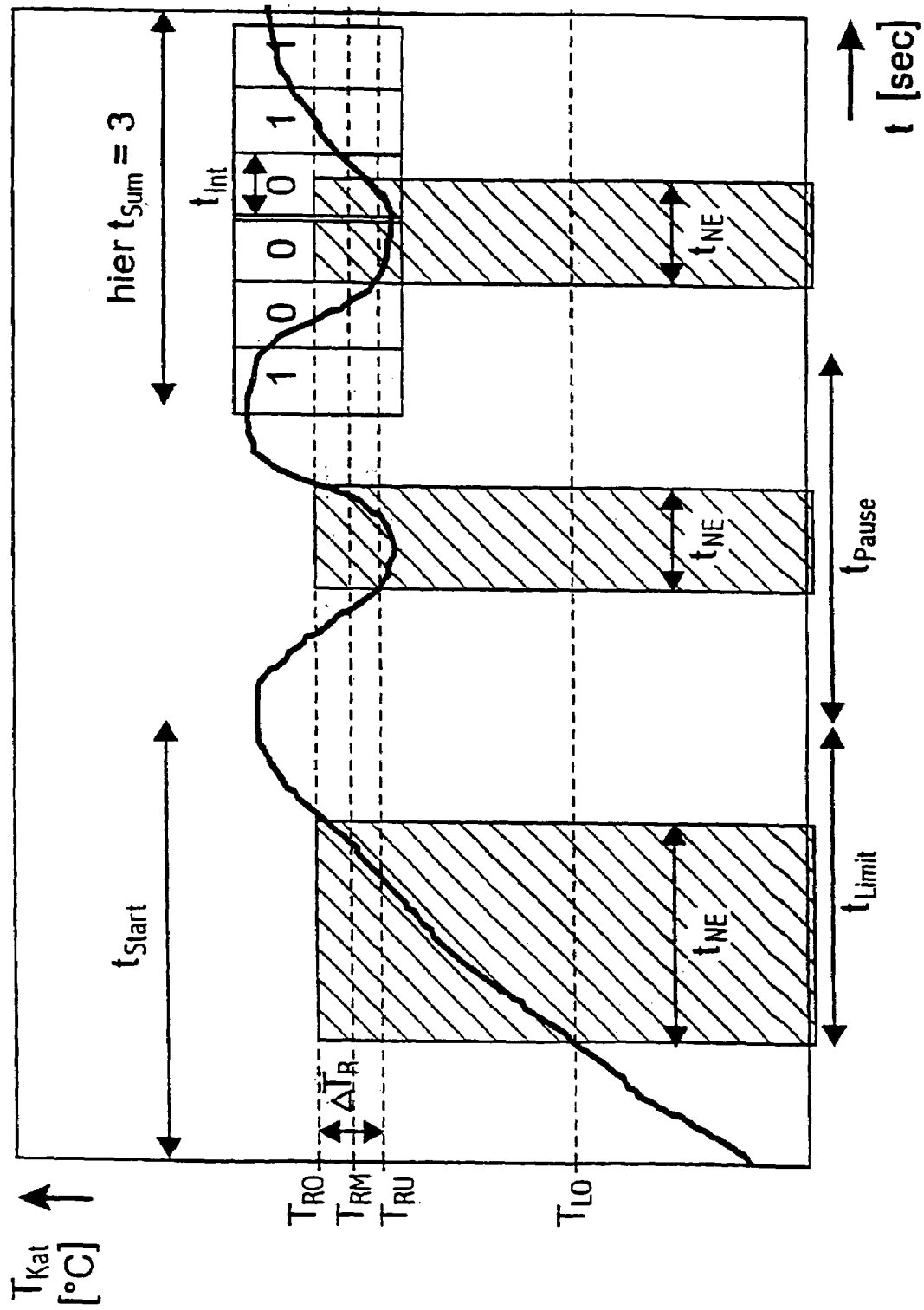

METHOD FOR THE POST-TREATMENT OF EXHAUST GASES BY SUBSEQUENT INJECTION OF FUEL IN A DIESEL-TYPE INTERNAL COMBUSTION ENGINE PROVIDED WITH A PRE-CATALYST AND A PARTICULATE FILTER

This application is a divisional application of U.S. patent application Ser. No. 10/129,079 filed May 2, 2002 now U.S. Pat. No. 6,971,230, which application is a U.S. National Stage of PCT/EP00/10241 filed Oct. 18, 2000, claiming priority to DE 19952830.6, filed on Nov. 2, 1999.

BACKGROUND OF THE INVENTION

This invention relates to a process of exhaust gas aftertreatment by secondary injection of fuel in a diesel internal combustion engine with precatalyst and particulate filter.

Use of a particulate filter to effectively reduce particulate emissions by a diesel engine effectively will be unavoidable in the future. Because of low exhaust gas temperatures, the filter is constantly charged with soot, something which in the extreme case can result in breakdown of a vehicle, especially in the event of repeated short-distance operation.

Document EP 0 621 400 A 1 discloses an air compressing internal combustion injection engine with exhaust gas aftertreatment equipment. A reducing agent may be fed to this internal combustion injection engine in order to reduce nitrogen oxides. The reducing agent is prepared in the final stage of combustion downstream from the ignition OT by secondary injection of fuel.

In addition, document DE 197 35 011 A 1 discloses a process in which exhaust gas temperature dependent and time dependent secondary fuel injection is prepared for the purpose of nitrogen oxide reduction. For this purpose transition is made from a first secondary injection mode to a second secondary injection mode involving a secondary injection amount higher than in the first mode.

Secondary injection or afterinjection of fuel in each instance serves the purpose of raising the exhaust gas temperature by means of an exothermal reaction which takes place within a specific exhaust gas temperature range; however, temperature alone does not represent a suitable criterion for effective secondary injection of fuel.

SUMMARY OF THE INVENTION

With this state of the art taken as a basis, it is the object of this invention to prepare an improved process for exhaust gas aftertreatment in which practical use of a particulate filter is made possible, especially in the event of frequent use in short-distance operation of diesel internal combustion engines, and so represents further advance in compliance with future exhaust gas emission standards as well as an opportunity for securing tax incentives for its development.

This object is attained by means of a process having the features specified in claim 1. Since afterinjection is performed both as a function of the temperature in the area of the precatalyst $T_{eat}$ near the engine and as a function of the state of charging of the particulate filter, both the activation and the amount of afterinjection NE for each load point may be ideally selected so that rapid heating of the particulate filter is ensured by exothermicity at the precatalyst, without significant penetration of CO or HC. As a result of the conversion of HC and CO which has already taken place at the precatalyst, NO may subsequently be oxidized to $NO_2$ with a high yield, which is subsequently required for oxidation of the soot in the particulate filter.

BRIEF DESCRIPTION OF THE DRAWING

Reference is made to the accompanying drawing in which FIG. 1 illustrates in simplified form the variation in the area of the $T_{cat}$ over time t.

The afterinjection NE is activated when the temperature in the area of the precatalyst $T_{eat}$ exceeds a light-off temperature $T_{LO}$ of around 160° C., since it is only above this light-off temperature that the conversion rate for unburnt hydrocarbons amounts to at least 50% and that further elevation of the temperature can take place as a result of afterinjection NE of additional fuel, so that regeneration of the particulate filter is introduced. The temperature in the area of the precatalyst $T_{cat}$ is measured by a thermocouple downstream from the precatalyst.

Afterinjection NE, on the other hand, is deactivated when the temperature in the area of the precatalyst $T_{eat}$ exceeds an upper regeneration temperature $T_{RO}$ of around 280° C. In addition, the afterinjection NE is reactivated when the temperature in the area of the precatalyst $T_{cat}$ falls below a lower regeneration temperature $T_{RU}$ of around 230° C. A sufficiently large regeneration temperature range $®T_R$ of about 50° C. is thereby determined within which oxidation of soot by $NO_2$ is ensured.

Provision is additionally made such that afterinjection NE or regeneration of the particulate filter does not exceed a specific period of time $t_i u_{mt}$. This period of time $t_i ;,,,;_t$ amounts, for example, to approximately 20 seconds and represents a sort of "emergency shutdown" if the precatalyst fails to start up.

For the sake of safety, provision is also made such that, if the precatalyst fails to start up, repeated afterinjection NE may take place only after a specific time delay $t_{pause}$. It is proposed that this time delay $_{;pause}$ amount to approximately 30 seconds and that it promote the possibility of subsequent repeated startup ("light-on") of the precatalyst.

It is advantageous for the state of charging of the particulate filter to be indicated by means of a counter Z and for the afterinjection NE to be permitted after a specific counter reading $Z_{Teg}$ is displayed which corresponds to an assigned charging state. In this way the charging state of the particulate filter may be displayed in a simple manner by means of a computer or modified and used as a criterion for afterinjection NE, and thus for regeneration of the particulate filter.

The counter Z reading is increased if the average regeneration temperature $T_{RM}$ between the upper regeneration temperature $T_{RO}$ and the lower regeneration temperature $T_{RU}$ has not been reached within a specific interval $t_{stan}$ after cold starting of the diesel internal combustion engine, since otherwise soot accumulation takes place within the particulate filter so that a higher state of charging is present.

In addition, the reading of the counter Z increases in the event of extreme short-distance operation. Such extreme short-distance operation may even make additional measures necessary, ones such as an electric device for heating the precatalyst, restriction of intake air flow, or shifting of the injection times in the "late" direction in conjunction with higher engine speed. Preference is then given to employment of these measures beginning with the next startup of the diesel internal combustion engine and may reduce the reading of the counter Z by a freely selectable amount.

In addition, the reading of the counter Z is lowered gradually by a specific amount if the mean generation temperature $T_{RM}$ between the upper regeneration temperature $T_{RO}$ and the lower regeneration temperature $T_{RU}$ is expected, since, when this sum $t_{sum}$ of established time intervals $t_{int}$ is present, burning away of the soot ensues, so that the state of charging of the particulate filter is correspondingly reduced. If decrease in the rate of reduction of the counter Z reading ensues with allowance made for the reaction kinetics as a function of the temperature, the operation of the counter Z with allowance made for this temperature dependence is characterized by especially high accuracy.

In addition, it is advantageous, in order to determine the state of charging of the particulate filter, also to monitor the back pressure in the exhaust gas system, since, although the back pressure does not of itself represent a suitable criterion for a specific charging state because any holes possibly present in the layer of soot result in a relatively low back pressure falsely indicating too low a charging state, additional certainty in determining the charging state of the particulate filter can nevertheless be provided by monitoring the back pressure.

Reference is made to the accompanying figure, which presents in simplified form the variation in temperature in the area of the $T_{eat}$ over time t, in order to illustrate the foregoing explanations.

The invention claimed is:

1. A process for exhaust gas aftertreatment by afterinjection of fuel in a diesel internal injection with a precatalyst and a particulate filter, the afterinjection NE being performed as a function of the temperature in the area of the precatalyst $T_{cat}$ near the engine, and the state of charging of the particulate filter, wherein the state of charging of the particular filter is indicated by means of a counter Z and the afterinjection NE is permitted only after a specific counter reading $Z_{reg}$ corresponding to a prescribed state of charging has been reached and the level of the counter Z is increased if the mean regeneration temperature $T_{RM}$ situated between the upper regeneration temperature $T_{RO}$ and the lower regeneration temperature $T_{RU}$ is not reached within a specific time period $t_{start}$ after a cold start of the diesel internal combustion engine and the afterinjection is activated with the temperature in the area of the precatalyst $T_{cat}$ exceeds a startup temperature $T_{LO}$ of approximately 160 degrees Celsius, such that the conversion rate for unburnt hydrocarbons is at least 50%.

2. The process as defined in claim 1, wherein back pressure in the exhaust system is monitored for the purpose of determining the state of charging of the particulate filter.

3. The process as defined in claim 1, wherein the back pressure in the exhaust system is monitored for the purpose of determining the state of charging of the particulate filter.

4. The process as defined in claim 1, wherein the afterinjection NE is deactivated when the temperature in the area of the precatalyst $T_{cat}$ exceeds an upper regeneration temperature $T_{RO}$ of approximately 280 degrees Celsius.

5. The process as defined in claim 4, wherein the afterinjection NE is reactivated when the temperature in the area of the precatalyst $T_{cat}$ falls below a lower regeneration temperature $T_{RU}$ of approximately 230 degrees Celsius.

6. A process for exhaust gas aftertreatment by afterinjection of fuel in a diesel internal injection with a precatalyst and a particulate filter, the afterinjection NE being performed as a function of the temperature in the area of the precatalyst $T_{cat}$ near the engine, and the state of charging of the particulate filter, wherein the state of charging of the particular filter is indicated by means of a counter Z and the afterinjection NE is permitted only after a specific counter reading $Z_{reg}$ corresponding to a prescribed state of charging has been reached and the level of the counter Z is increased if the mean regeneration temperature $T_{RM}$ situated between the upper regeneration temperature $T_{RO}$ and the lower regeneration temperature $T_{RU}$ is not reached within a specific time period $t_{start}$ after a cold start of the diesel internal combustion engine, wherein the afterinjecion NE is deactivated when the temperature in the area of the precatalyst $T_{cat}$ exceeds an upper regeneration temperature $T_{RO}$ of approximately 280 degrees Celsius.

7. The process defined by claim 6, wherein the afterinjection NE is reactivated when the temperature in the area of the precatalyst $T_{cat}$ falls below a regeneration temperature $T_{RU}$ of approximately 230 degrees Celsius.

8. A process for exhaust gas aftertreatment by afterinjection of fuel in a diesel internal injection with a precatalyst and a particulate filter, the afterinjection NE being performed as a function of the temperature in the area of the precatalyst $T_{cat}$ near the engine, and the state of charging of the particulate filter, wherein the state of charging of the particular filter is indicated by means of a counter Z and the afterinjection NE is permitted only after a specific counter reading $Z_{reg}$ corresponding to a prescribed state of charging has been reached and the level of the counter Z is increased if the mean regeneration temperature $T_{RM}$ situated between the upper regeneration temperature $T_{RO}$ and the lower regeneration temperature $T_{RU}$ is not reached within a specific time period $t_{start}$ after a cold start of the diesel internal combustion engine, wherein the afterinjection NE must not exceed a specific period of time $t_{limit}$.

9. The process as defined in claim 8, wherein repeated afterinjection NE may be performed only after expiration of a specific period of time $T_{pause}$.

10. The process as defined in claim 8, wherein the back pressure in the exhaust system is monitored for the purpose of determining the state of charging of the particulate filter.

11. A process for exhaust gas aftertreatment by afterinjection of fuel in a diesel internal injection with a precatalyst and a particulate filter, the afterinjection NE being performed as a function of the temperature in the area of the precatalyst $T_{cat}$ near the engine, and the state of charging of the particulate filter, wherein the state of charging of the particular filter is indicated by means of a counter Z and the afterinjection NE is permitted only after a specific counter reading $Z_{reg}$ corresponding to a prescribed state of charging has been reached and the level of the counter Z is increased if the mean regeneration temperature $T_{RM}$ situated between the upper regeneration temperature $T_{RO}$ and the lower regeneration temperature $T_{RU}$ is not reached within a specific time period $t_{start}$ after a cold start of the diesel internal combustion engine, wherein the level of the counter Z is increased in the event of short-distance operation.

12. The process as defined in claim 11, wherein the counter level is progressively lowered when the mean regeneration temperature $T_{RM}$ situated between the upper regeneration temperature $T_{RO}$ and the lower regeneration temperature $T_{RU}$ is exceeded for a specific sum $t_{sum}$ of established time intervals $t_{int}$.

13. The process as defined in claim 11, wherein the counter level is progressively lowered when the mean regeneration temperature $T_{RM}$ situated between the upper regeneration temperature $T_{RO}$ and the lower regeneration temperature $T_{RU}$ is exceeded for a specific sum $t_{sum}$ of established time intervals $t_{int}$.

14. The process as defined in claim 13, wherein the level of the counter Z is lowered as a function of temperature.

15. The process as defined in claim 14, wherein the afterinjection NE must not permitted to exceed a specific period of time $t_{limit}$.

16. The process as defined in claim 15, wherein repeated afterinjection NE may be performed only after an expiration of a specific period of time $t_{pause}$.

17. A process for exhaust gas aftertreatment by afterinjection of fuel in a diesel internal injection with a precatalyst and a particulate filter, the afterinjection NE being performed as a function of the temperature in the area of the precatalyst $T_{cat}$ near the engine, and the state of charging of the particulate filter, wherein the state of charging of the particular filter is indicated by means of a counter Z and the afterinjection NE is permitted only after a specific counter reading $Z_{reg}$ corresponding to a prescribed state of charging has been reached and the level of the counter Z is increased if the mean regeneration temperature $T_{RM}$ situated between the upper regeneration temperature $T_{RO}$ and the lower regeneration temperature $T_{RU}$ is not reached within a specific time period $t_{start}$ after a cold start of the diesel internal combustion engine, wherein the counter level is progressively lowered when the mean regeneration temperature $T_{RM}$ situated between the upper regeneration temperature $T_{RO}$ and the lower regeneration temperature $T_{RU}$ is exceeded for a specific sum $t_{sum}$ of established time intervals $t_{int}$.

* * * * *